United States Patent [19]
Bailey

[11] Patent Number: 5,398,355
[45] Date of Patent: Mar. 21, 1995

[54] THREE-PLY INSULATING COVER FOR A WATER BED BLADDER

[76] Inventor: Curt Bailey, R.F.D. #2, Box 205, Lake Shore Dr., Oxford, Me. 04270

[21] Appl. No.: 96,381

[22] Filed: Jul. 26, 1993

[51] Int. Cl.$^6$ .............................. A47G 9/00; B32B 5/18
[52] U.S. Cl. .................................... 5/500; 428/246; 428/316.6; 5/502
[58] Field of Search .............. 5/500, 502, 451, 420, 5/413, 483, 484, 496; 428/246, 316.6

[56] References Cited

U.S. PATENT DOCUMENTS

| | | | |
|---|---|---|---|
| 2,801,427 | 8/1957 | Crocker | 5/500 |
| 4,549,323 | 10/1985 | Brockhaus | 5/500 |
| 4,961,238 | 10/1990 | Limb et al. | 5/500 |
| 5,092,006 | 3/1992 | Fogel | 5/502 |
| 5,161,271 | 11/1992 | Gronbach | 5/451 |
| 5,285,542 | 2/1994 | West et al. | 5/500 |

FOREIGN PATENT DOCUMENTS 9006073  6/1990  WIPO ..................... 5/500

*Primary Examiner*—Alexander Grosz
*Attorney, Agent, or Firm*—Frederick R. Cantor

[57] ABSTRACT

A flexible cover for a waterbed mattress is constructed as a three-ply construction. A central ply formed of heat insulating materials is sandwiched between two similarly constructed outer plies that are formed of moisture-absorbent materials. Moisture generated by the person's body is trapped within the uppermost layer, or ply, of the cover. Body heat passes through the moisture-absorbent layer into the central ply of the cover, where it is trapped, or contained. The person, therefore, does not experience the chilling effect that persons sometimes feel when lying on a waterbed. The three-ply cover is reversible, such that the cover can be placed on the waterbed mattress with either major surface facing upward.

5 Claims, 1 Drawing Sheet

THREE-PLY INSULATING COVER FOR A WATER BED BLADDER

BACKGROUND OF THE PRESENT INVENTION

The present invention relates to a cover for a waterbed mattress, or bladder.

The present invention further relates to a cover for a waterbed mattress, that has thermal insulation properties for protecting the bed occupant against hypothermia, due to excessive temperature drop from the person's skin to the relatively cool bladder surface.

U.S. Pat. No. 4,754,514, issued to G. Limb, et al., on Jul. 5, 1988, discloses an insulating coverlet for conventional unheated waterbeds. The coverlet incorporates an insulating layer of fibrous materials. e.g., polyester fibers, quilted between a decorative cover, and a flexible foam base layer. The insulating coverlet is placed on the upper surface of the waterbed bladder, in order to prevent the loss of body heat from the bed occupant into the unheated water.

U.S. Pat. No. 4,549,323, issued to P. Brockhaus, on Oct. 29, 1985, discloses a waterbed mattress cover that includes a lower porous sheet that is stitched along three of its edges to a top panel containing dacron fiberfill material. The lower sheet and top panel are open along one side edge to provide an access opening for an insulator pad. Apparently, the pad can be slid, or inserted, into the space between the lower sheet and the top panel.

The insulator pad comprises two polyethylene sheets, having bubble-forming indentations arranged in back-to-back relation. Two heat reflective metal foil sheets are bonded to the outer surfaces of the polyethylene sheets for closing the bubble chambers. The pad has heat insulation properties.

U.S. Pat. No. 5,092,006, issued to I. Fogel, on Mar. 3, 1992, shows a cover for a waterbed mattress, comprising a lower liner sheet of polyvinyl chloride plastic material, and an upper panel, that is apparently formed of strong cotton, or linen, cloth, described as ticking, in the patent. The peripheral edge of the upper cloth panel has a zipper connection to a quilted side wall, or skirt, that extends downwardly along the side edges of the waterbed mattress.

Interposed between the top panel and the lower liner sheet is an insulating cushion that can comprise a polyethylene film, having an aluminized heat-reflective surface, and a layer of polyurethane foam, bonded to the aluminized surface of the polyethylene film. The insulating cushion is removably disposed between the aforementioned lower liner sheet and the upper panel, such that the cushion may be oriented with its heat-reflective surface facing upward, or downward, depending on the way in which the cushion is inserted into the waterbed mattress cover. The zippered connection between the upper panel and the peripheral skirt apparently provides access for reversing the cushion, i.e., for removing the cushion, turning it over, and reinserting the cushion into the space between the lower liner sheet and the upper cloth panel.

SUMMARY OF THE PRESENT INVENTION

An object of the present invention is to provide a cover for a waterbed mattress, or bladder.

A further object of the present invention is to provide a cover for a waterbed mattress, that has thermal insulation properties for protecting the bed occupant against hypothermia, due to excessive temperature drop from the person's skin to the relatively cool bladder surface.

The present invention comprises, a three-ply cover, that includes a central ply having thermal insulating properties, and two outer plies, sandwiched against the exposed faces of the central ply. The central ply can include an inner sheet of thermally reflective material, and a thin foam panel bonded to each surface of the thermally reflective sheet. Each outer ply can be a quilted pad that includes two woven cloth sheets and an intervening batting layer containing non-woven fibrous batting material, e.g., cotton batting. The cloth sheets in each pad are sewn to each other and to the intervening layer of batting material with a criss-cross pattern of stitches, such that each pad is a self-contained entity, separate from the central ply. The quilted pads are adhesively bonded to the outer flat surfaces of the foam panels that define the central ply.

The primary function of the central ply is to provide a heat insulation barrier between the person lying on the waterbed and the relatively cool surface of the waterbed bladder. Heat is reflected back towards the person's body, such that the person is prevented from becoming chilled, due to the heat-absorbing capability of the waterbed bladder and the water contained therein.

A primary function of each outer ply, is to provide an absorbent filler material for containment of any moisture that might be generated at the surface of the person's body. Such moisture is enabled to flow through the cloth covering in each quilted pad, so as to become trapped in the layer of fibrous batting material.

Each outer ply has a quilted outer surface, preferably a woven cloth material, that is relatively soft and non-abrasive to the person's skin, or pajamas, such that the person feels comfortable when lying on the three-ply cover. The quilted outer surface of each pad is soft, without being slippery to the touch, such that the person is not likely to slide, or slip, on the cover surface.

Each outer ply has the same construction, so that the cover is, in effect, reversible. The cover can be used with either quilted pad facing upwardly. Should the cover become stained, or laden with moisture, in the upper quilted pad, the cover can be turned over to position the other quilted pad uppermost.

In summary, and in accordance with the above discussion, the foregoing objectives are achieved in the following embodiments.

A BRIEF DESCRIPTION OF THE DRAWINGS

DESCRIPTION OF THE PREFERRED EMBODIMENTS OF THE PRESENT INVENTION

Figure 1:
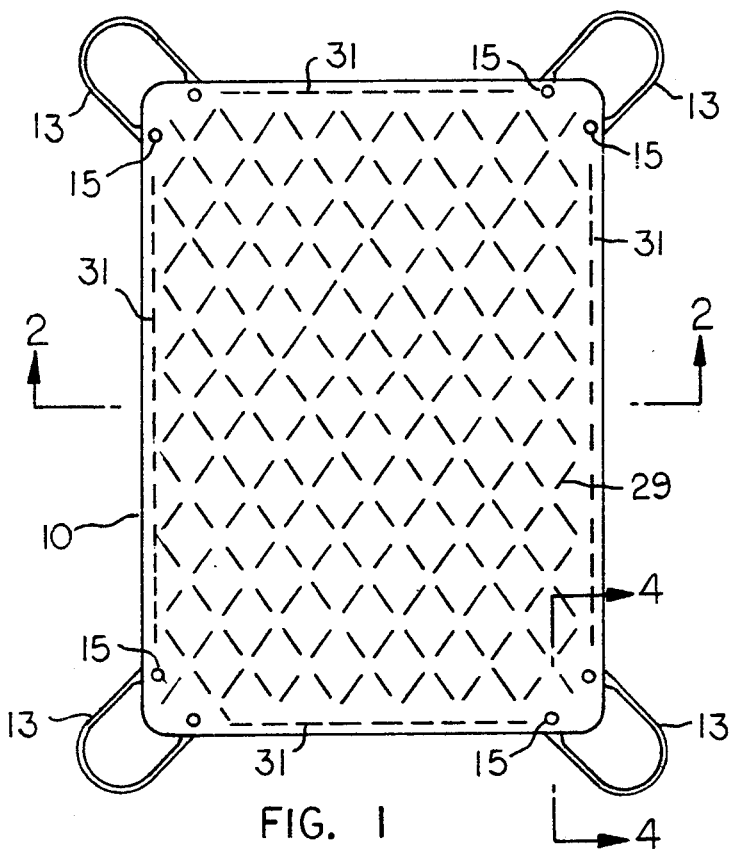
FIG. 1, is a plan view, of a mattress cover, embodying the present invention.

FIG. 1, is a plan view, of a mattress cover, embodying the present invention.

The drawings show a novel cover 10, for a conventional waterbed mattress or bladder. As shown in FIG. 1, the cover 10, has a rectangular configuration, with the corner areas of the cover 10, being preferably rounded. An anchorage strap 13, is secured to each corner of the cover 10, by means of two rivets 15. Each strap 13, forms a loop, adapted for downward extension, and placement, around a corner area of the waterbed bladder (not shown), for securing the cover 10, in place.

The cover 10, is of three-ply construction. The central ply 17, of the cover 10, comprises an inner sheet of thermally reflective material 19, and two flexible foam panels 21, bonded to the oppositely-facing surfaces of the reflective sheet 19. The reflective sheet 19, may be formed of aluminum foil. The foam panels 21, can be formed of a plastic material foam, e.g., polyurethane, or an elastomer. The foam material is preferably a closed-cell foam, whereby the foam has some thermal insulation properties. Reflective sheet 19, acts as a thermal reflector, to reflect heat back through the foam material, thereby preventing the free flow of heat through the central ply 17, of the cover 10.

Figure 2:
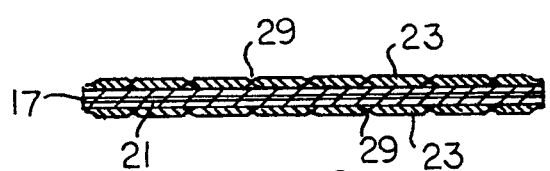
FIG. 2, is a sectional view, taken along line 2—2, in FIG. 1.

FIG. 2, is a sectional view, taken along line 2—2, in FIG. 1.

Figure 5:
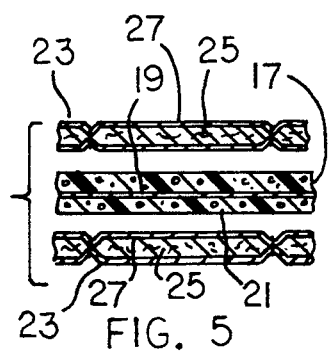
FIG. 5, is an exploded, fragmentary, sectional view, taken in the same direction as FIG. 3, but with the plies of the cover separated for illustration purposes.
Figure 3:
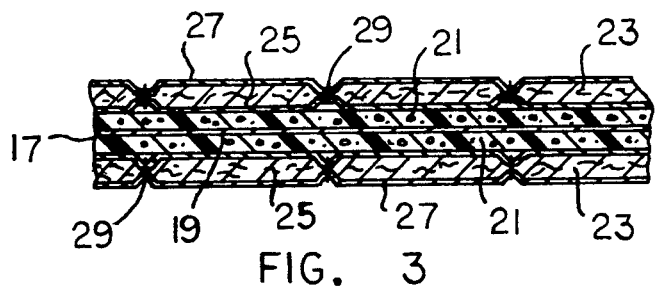
FIG. 3, is a fragmentary, enlarged, sectional view, taken in the same direction as FIG. 2.

FIG. 5, is an exploded, fragmentary, sectional view, taken in the same direction as FIG. 3, but with the plies of the cover separated for illustration purposes.

Cover 10, further comprises two similarly constructed outer plies 23. Each outer ply 23, is a soft moisture-absorbent pad, formed separately from the central ply 17. The core of each outer ply 23, is cotton batting layer 25. Two porous woven cloth sheets 27, are sewn to each other and to the intervening layer of batting 25, by a criss-cross pattern of stitches 29. The stitches 29, extend essentially across the entire face of the moisture-absorbent pad 23, as shown in FIG. 1. Each outer ply 23, is formed separately from the central ply 17.

After the central ply 17, and the two outer plies 23, have been separately formed, they are adhesively bonded together, preferably by a film of moisture-impervious adhesive applied to the oppositely-extending surfaces of foam panels 21. The adhesive prevents any migration of moisture into the foam material. As shown in FIG. 1, the three plies may be additionally secured by a row of stitches 31, extending through the three plies along the side edges of the cover 10.

FIG. 3, is a fragmentary, enlarged, sectional view, taken in the same direction as FIG. 2.

Figure 4:
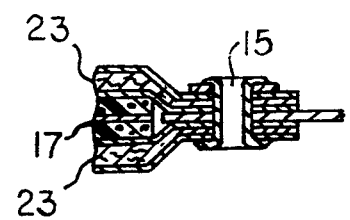
FIG. 4, is an enlarged, sectional view, taken along line 4—4, in FIG. 1.

FIG. 4, is an enlarged, sectional view, taken along line 4—4, in FIG. 1.

At the corner areas of the three-ply panel, the central ply 17, is cut away, such that the corner areas of the outer plies 23, can be brought into facial engagement with each other, as shown in FIG. 4. End areas of strap 13, are inserted into the space between the two outer plies 23, and rivets 15, are extended through mating holes in the strap 13, and outer plies 23. The rivets 15, act as securing devices, for firmly attaching the ends of straps 13, to the three-ply cover 10. Straps 13, form loops, that can also be looped around corner areas of the waterbed bladder, for anchoring the cover 10, to the bladder, or mattress.

The illustrated cover 10, can be used with either of the major surfaces facing upwardly. Straps 13, can also be extended away from the plane of the cover 10, in either direction.

Each outer ply 23, is designed to form a relatively soft, non-slip surface, that is comfortable for a person resting on the waterbed. Any moisture generated on the person's body can migrate freely through the uppermost woven cloth sheet 27, into the subjacent cotton batting layer 25, where it is absorbed and effectively trapped. The moisture-impervious adhesive between the central ply 17, and each outer ply 23, prevents the moisture from reaching the foam panels 21.

Central ply 17, acts as a thermal insulator, to prevent the person's body heat from being transmitted into the relatively cool water in the water bed mattress. Some of the person's body heat is contained within the uppermost foam panel 21. The reflective action of the aluminum foil 19, contains, or confines, the body heat within the uppermost foam panel 21, so that heat flow from the person's body, downwardly towards the waterbed mattress, is relatively minor. As a result, the person does not experience the chilling effect, that is often associated with sleeping on a waterbed.

As previously noted, the three-ply cover 10, is reversible. The cover 10, therefore, can be positioned with either outer ply 23, uppermost.

The present invention, described above, relates to waterbed covers, having thermal insulating properties. Features of the present invention are recited in the appended claims. The drawings contained herein necessarily depict structural features and embodiments of the waterbed cover, useful in the practice of the present invention.

However, it will be appreciated by those skilled in the arts pertaining thereto, that the present invention can be practiced in various alternate forms and configurations. Further, the previous detailed descriptions of the preferred embodiments of the present invention are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What is claimed is:

1. A three-ply cover for a conventional waterbed bladder, comprising:

a central ply, having thermal insulation properties;

said central ply, having a first major face and a second major face;

two outer plies secured to said major faces of said central ply;

one of said outer plies being bonded to said first major face, the other outer ply being bonded to said second major face;

said central ply, comprising, an inner sheet of thermally reflective material having oppositely facing surfaces, and a flexible foam panel, bonded to each one of said surfaces;

each foam panel having the same thickness;

each outer ply comprising a quilted pad that includes two woven cloth sheets and an intervening nonwoven fibrous batting layer;

said cloth sheets being sewn to each other and to said intervening layer of batting with a criss-cross pattern of stitches;

each outer ply being formed separately;

each outer ply being adhesively bonded to said central ply; and each outer ply having the same construction, whereby the three-ply cover can have either surface thereof engaged with the waterbed bladder.

2. The three-ply cover, as described in claim 1, wherein each woven cloth sheet is porous, whereby moisture can migrate through each cloth sheet into the associated fibrous batting layer.

3. The three-ply cover, as described in claim 1, wherein each foam panel has a flat face, bonded to a woven cloth sheet of one of said outer plies.

4. The three-ply cover, as described in claim 1, wherein:

said cover has four corners, and a cover anchorage strap attached to each corner;

said central ply being cut away at each corner so that the outer plies are in facing relation at the corners; and each strap having two end areas inserted between the facing outer plies, and a rivet extending through the outer plies and each strap end area, whereby the straps are secured to corner areas of the cover.

5. The three-ply cover, as described in claim 1, and further comprising, a moisture-impervious adhesive coating on each major face of said central ply to bond the three plies together, and provide a moisture barrier between the central ply and the two outer plies.

* * * * *